(12) United States Patent
Otani

(10) Patent No.: US 10,754,474 B2
(45) Date of Patent: Aug. 25, 2020

(54) PROJECTOR SYSTEM

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/462,363

(22) PCT Filed: Nov. 6, 2017

(86) PCT No.: PCT/JP2017/039969
§ 371 (c)(1),
(2) Date: May 20, 2019

(87) PCT Pub. No.: WO2018/092627
PCT Pub. Date: May 24, 2018

(65) Prior Publication Data
US 2019/0324571 A1 Oct. 24, 2019

(30) Foreign Application Priority Data

Nov. 21, 2016 (JP) ................................. 2016-225729

(51) Int. Cl.
*G06F 3/042* (2006.01)
*H04N 13/239* (2018.01)
*H04N 9/31* (2006.01)
*G06T 7/70* (2017.01)

(52) U.S. Cl.
CPC ............... *G06F 3/042* (2013.01); *G06T 7/70* (2017.01); *H04N 9/31* (2013.01); *H04N 13/239* (2018.05); *G06T 2207/10012* (2013.01); *G06T 2207/30196* (2013.01)

(58) Field of Classification Search
CPC ................................ G06F 3/042; H04N 13/239
See application file for complete search history.

(56) References Cited

U.S. PATENT DOCUMENTS

| 9,843,781 | B1 * | 12/2017 | Furui | ..................... H04N 5/232 |
| 10,209,786 | B2 * | 2/2019 | Otani | ..................... G03B 21/14 |
| 10,250,859 | B2 * | 4/2019 | Furui | ..................... H04N 5/232 |
| 10,502,938 | B2 * | 12/2019 | Otani | ................. G02B 27/0961 |
| 10,516,864 | B2 * | 12/2019 | Otani | ................... H04N 13/246 |
| 10,534,448 | B2 * | 1/2020 | Njolstad | ............ G06F 3/03542 |

(Continued)

FOREIGN PATENT DOCUMENTS

| JP | H04-068307 A | 3/1992 |
| JP | H08-328735 A | 12/1996 |

(Continued)

OTHER PUBLICATIONS

Jan. 30, 2018 International Search Report issued in International Patent Application No. PCT/JP2017/039969.

*Primary Examiner* — Irfan Habib
(74) *Attorney, Agent, or Firm* — Oliff PLC

(57) ABSTRACT

A projector system includes a projector main body that obliquely projects image light and an imager that operates based on a stereographic projection scheme and captures an image of a stereographic region containing a projection region where the image light from the projector main body is projected to detect a pointing element present in the stereographic region.

18 Claims, 18 Drawing Sheets

(56) References Cited

U.S. PATENT DOCUMENTS

| | | | |
|---|---|---|---|
| 2003/0071813 A1* | 4/2003 | Chiabrera | H04N 13/324 345/426 |
| 2009/0169095 A1* | 7/2009 | Zhuang | G01B 11/2545 382/154 |
| 2009/0279055 A1* | 11/2009 | Amano | G03B 3/00 353/101 |
| 2012/0019530 A1* | 1/2012 | Baker | G02B 30/23 345/419 |
| 2014/0036142 A1* | 2/2014 | Inoko | G02B 3/00 348/369 |
| 2014/0298269 A1* | 10/2014 | Underkoffler | G06F 3/0325 715/848 |
| 2015/0054735 A1* | 2/2015 | Nakama | G06F 3/0304 345/156 |
| 2015/0208050 A1* | 7/2015 | Pawlak | H04N 9/3185 348/189 |
| 2016/0259402 A1* | 9/2016 | Masuda | H04N 9/3194 |
| 2017/0045947 A1* | 2/2017 | Tarn | G06F 3/005 |
| 2017/0264871 A1* | 9/2017 | Fujiune | H04N 9/3185 |
| 2018/0070063 A1* | 3/2018 | Furui | H04N 9/315 |
| 2018/0250813 A1* | 9/2018 | Shimodaira | B25J 9/1697 |
| 2019/0014295 A1* | 1/2019 | Fujiune | H04N 9/28 |

FOREIGN PATENT DOCUMENTS

| | | |
|---|---|---|
| JP | 2004-177435 A | 6/2004 |
| JP | 2010-282463 A | 12/2010 |
| JP | 2011180712 * | 9/2011 |
| JP | 2012-038025 A | 2/2012 |
| JP | 2015-043154 A | 3/2015 |
| JP | 2015-159524 A | 9/2015 |
| JP | 2016-105191 A | 6/2016 |

\* cited by examiner

PROJECTOR SYSTEM

BACKGROUND

1. Technical Field

The present invention relates to a projector system for achieving what is called an interactive projector capable of wiring operation by detecting a pointing element, such as a finger, present on a projection screen and reflecting the detected pointing element in the content of a projected image.

2. Related Art

JP-A-2015-159524 discloses a projector that achieves the interactive function by providing a light output apparatus that is provided separately from a projection mechanism of the projector and outputs infrared light in such a way that a layer of the infrared light is formed substantially across a projection screen (screen) and detecting the infrared light outputted from the light output apparatus and reflected off the tip of a pointing element (fingertip, for example) to detect pointing operation performed via the pointing element. In the configuration described above, however, an apparatus that radiates laser light is necessary, and precise positioning is further necessary. Further, a detectable range is a two-dimensional region formed by the infrared light layer.

As a scheme that does not use the apparatus described above, there is a method for recognizing the shape of a finger to detect a pointing position. In this case, however, to recognize the shape of the finger, it is necessary to perform detection over a wide range of the image light projected region and a region therearound. To this end, an imaging apparatus having a wide angle of view is, for example, necessary. When the detection range widens, however, it is difficult to perform detection in a peripheral region of the detection range. For example, in an image of the captured detection range, a target location to be detected is distorted and reduced in size at the periphery of the image. In this case, false detection or unsuccessful detection is quite likely to occur.

SUMMARY

An aspect of the invention is to provide a projector system capable of detecting a pointing element over a wide range and further capable of reliably detecting the position of the pointing element even when the attitude of the pointing element changes.

The projector system according to the invention includes a projector main body that obliquely projects image light and an imager that operates based on a stereographic projection scheme and captures an image of a stereographic region containing a projection region where the image light from the projector main body is projected to allow detection of a pointing element present in the stereographic region.

In the projector system described above, the imager, which operates based on the stereographic projection scheme, can have an increased angle of view, can therefore capture not only an image of the projection region where the obliquely projected image light is projected but an image of the stereographic region containing the projection region, and can further reliably grasp the pointing element present in the stereographic region. In particular, employing the stereographic projection scheme can avoid a situation in which a change in the angle of the pointing element, which is a subject, distorts the pointing element and reduce the size thereof in an image while suppressing difficulty in optical design of the imager, whereby the position of the pointing element can be reliably detected.

According to a specific aspect of the invention, the imager includes at least two cameras that each captures an image of the stereographic region. In this case, parallax information for grasping the pointing element in the form of a stereographic shape can be acquired.

According to a still another aspect of the invention, the projector main body has a throw ratio smaller than or equal to 0.27. That is, the projector system performs what is called ultrashort-focal-length proximity projection.

According to another aspect of the invention, the projector main body forms a projection region greater than or equal to inches.

According to a still another aspect of the invention, the is imager inclines by a tilt angle that falls within a range of $10°±5°$. For example, in a case where the throw ratio of the projector is smaller, the angle of view of the imager needs to be increased. Instead, tilting the imager by a tilt angle allows suppression of an increase in the angle of view of the imager as compared with an imager that cannot be tilted.

According to a still another aspect of the invention, the imager performs the imaging in such a way that the stereographic region, which is the imaging range, includes a region from the projection region to a plane in front thereof and separate therefrom by at least 16 cm. In this case, when the pointing element is, for example, a human finger, a range large enough to identify and detect the shape of the human hand (or finger) can be provided.

According to a still another aspect of the invention, the projector system further includes a projector controller that identifies an image projection position based on information on the image light acquired by the imager and a position of the pointing element detected by the imager and performs image projection control based on a relationship between the identified positions. In this case, the projector controller can associate the image projection position with the position at which the pointing element is pointing and write, for example, the motion of the fingertip as the pointing element onto a projection screen to achieve the action of an interactive projector. As the aspect of the projector controller, it is conceivable to employ, for example, a case where the projector controller is incorporated in the projector main body and a variety of other aspects, such as a case where a PC connected to the projector main body functions as the projector controller.

According to a still another aspect of the invention, the projector main body performs image projection that reflects information on a position of the pointing element detected by the imager. In this case, interactive image projection that reflects information on the position at which the pointing element is pointing is achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A projector system according to a first embodiment of the invention will be described below with reference to the drawings.

Figure 1:
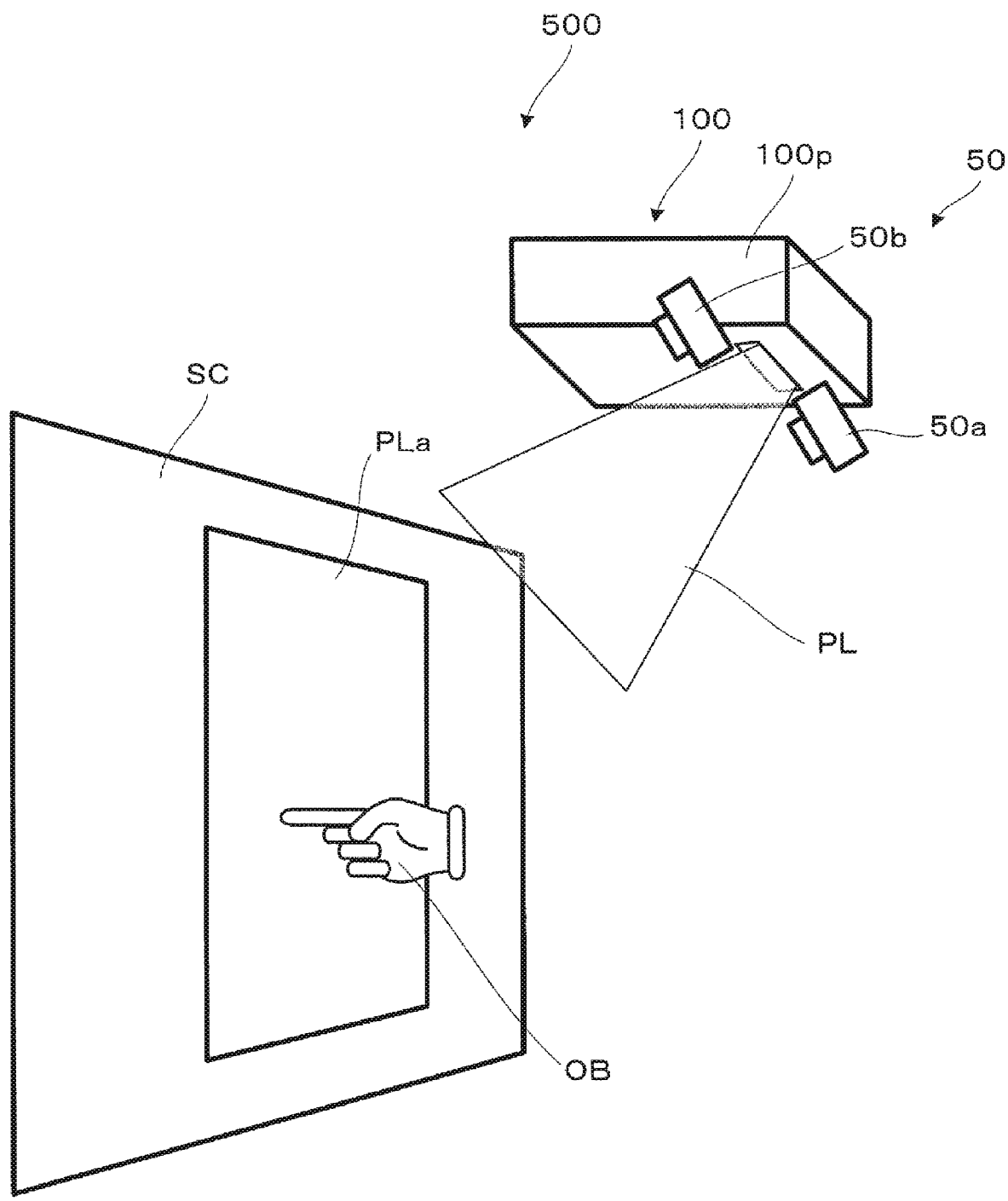
FIG. 1 shows a schematic configuration of a projector system according to a first embodiment.

A projector system 500 shown FIG. 1 and other figures is formed of a projector 100, which (obliquely) projects projection light PL, which is image light, for image projection. A radiated region PLa, onto which the projection light PL is radiated, is formed, for example, on a screen SC. The radiated region PLa corresponds to the region where the projection light (image light) PL from the projector 100 is projected. Although not shown, the projector system 500 is formed not only of the projector 100 but of a PC or any other apparatus connected to the projector system 500 and allows image operation in an interactive situation in which the PC carries out a variety of processes as required to accept writing operation performed on a display screen in the radiated region PLa. Among the components of the projector system 500, the projector 100 is a short-focal-length projector that is installed obliquely above the screen SC and performs proximate projection toward the screen SC located obliquely below the projector 100 (what is called ultrashort-focal-length proximity projection in the description), and the projector system 500 is formed of a projector main body 100p, which is a main body portion for the image projection, and an imager 50.

The projector main body 100p projects the projection light PL, which is image light formed of a combination of light fluxes that belong to the visible wavelength band, toward the screen SC to form a projected image (color image). In the projector system 500, to allow interactive image projection, it is assumed that positioning (calibration) for identification of the position of a pointing element on the projection screen has been performed. The calibration will be described later with reference to FIG. 14.

Figure 2:
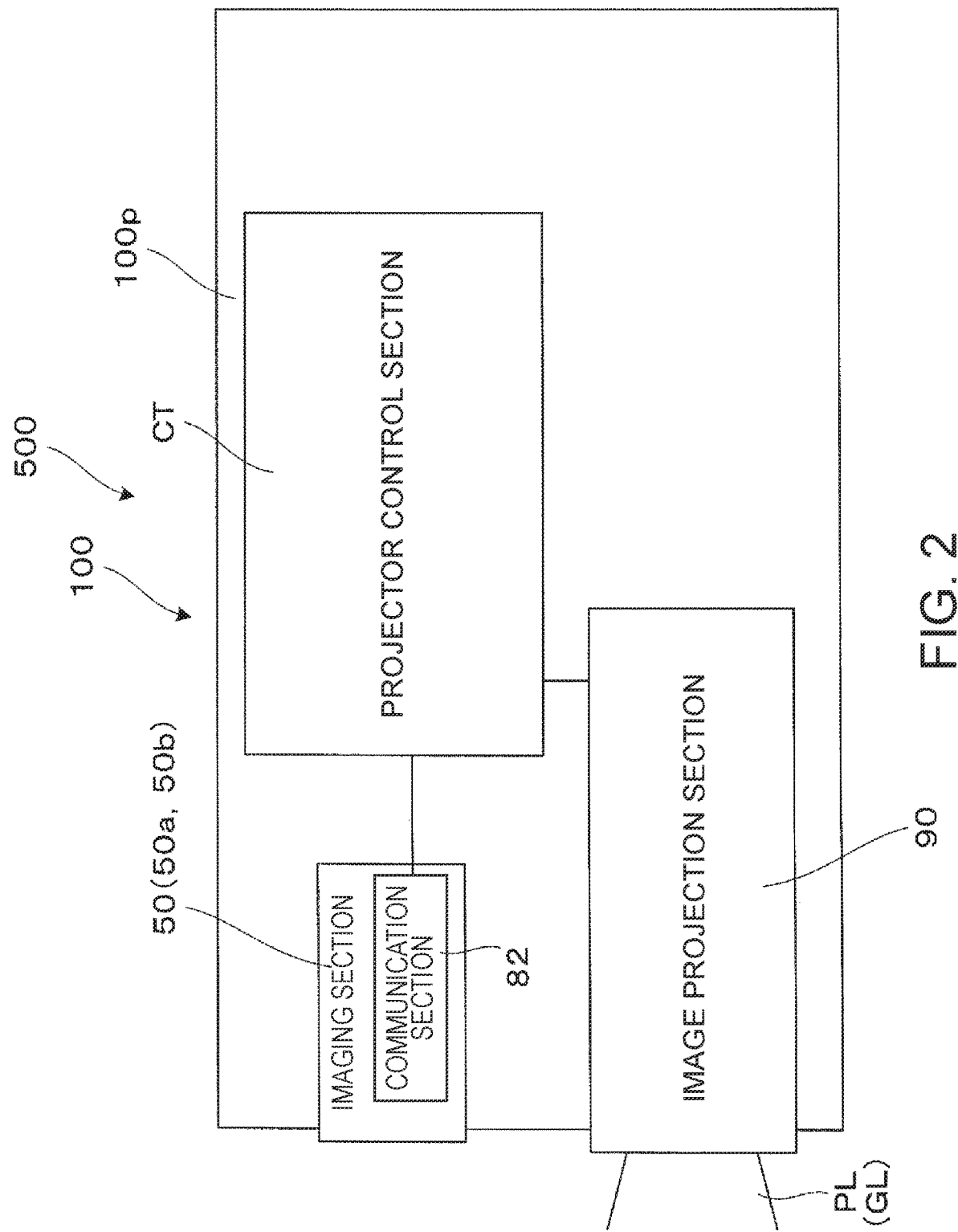
FIG. 2 shows the configuration of the projector system.

The projector main body 100p, although not illustrated in detail, includes a light source, a light modulator, a projection optical system, and other components and projects an image on the screen SC. To this end, the projector main body 100p includes an image projection section 90, which includes the projection optical system, and a projector controller CT, as shown, for example, in FIG. 2, and the projector controller CT performs a variety of types of action control, such as the image projection. In particular, the projector controller CT can accept information from the imager 50 via a communication section 82 in the imager 50 and can correct the content of an image to be projected in consideration of the information from the imager 50 to perform writing operation on the screen. That is, interactive image projection is achieved.

The optical system that forms the projector main body 100p can be any of a variety of aspects of optical system. For example, the light source and other components can be configured in a variety of manners. The light source can, for example, be a laser light source, an LED light source, or even an organic EL (O-LED) light source. In a case where a self-luminous light source, such as an organic EL device, in particular, is used, the projector main body 100p can be configured as a video apparatus with the light source also performing light modulation. In a case where the light source (backlight) and the light modulation are separately configured, the light modulator can, for example, be a transmissive liquid crystal panel.

Referring back to FIG. 1, the image section 50 is a sensor apparatus that captures a projected image projected from the projector main body 100p and acquires image information. In the present embodiment, in particular, the imager 50 is formed of two (a plurality of) cameras 50a, and 50b so disposed as to be separate from each other. The cameras 50a and 50b comply with the same standard, operate as a pair, and are disposed in bilateral symmetry with respect to the position where the projection light PL is projected from the projector main body 100p. The cameras 50a and 50b each include, for example, not only an imaging lens system but a light receiving device (imaging device), that is, light receiving sensor and a control apparatus that performs a variety of types of control including transmission to another apparatus via the communication section 82 (see FIG. 2). Providing the plurality of cameras 50a and 50b (stereo camera) described above allows the projector 100 to acquire parallax information (or stereo image). That is, the projector 100 allows sophisticated position detection based on the stereo vision. The projector controller CT (see FIG. 2) causes the image projection section 90 (see FIG. 2) to project an image that reflects information on the position of a pointing element (such as user's fingertip) OB detected by using the parallax information based on the image information acquired by the imaging performed by the imager 50a, 50b. The two cameras 50a and 50b, to perform the role as a configuration for grasping the position of an image projected by the projector 100, are so disposed, for example, that a lens system of each of the cameras is set, for example, at an angle corresponding to the projection angle, the projection distance, or any other factor in the image projection performed by the projector main body 100p. That is, even when the environment in which the projector 100 is installed changes and the projection distance or any other factor changes accordingly, the positional relationship between the projector main body 100p and the imager 50 does not change, or the positional relationship changes only by a degree so small that the image can be corrected or otherwise processed.

Further, the projector main body 100p allows calibration that associates the positions of pixels of an image formation section (pixel matrix in light modulation) that forms the projector main body 100p with the positions of pixels of the imaging device (light receiving sensor) built in each of the cameras 50a and 50b based on the image information acquired by the imager 50.

The imager 50 can be incorporated as a portion that forms the projector 100, and the imager 50 may instead be present, for example, as an imaging apparatus separate from the projector 100.

As described above, since the projector system 500 according to the present embodiment performs what is called ultrashort-focal-length proximity projection, it is necessary to increase the imaging range of the imager 50 (cameras 50a and 50b) attached in the vicinity of the projector main body 100p. Further, the imager 50 needs to have a wide angle of view also from the viewpoint of acquisition of the three-dimensional position of the finger, which is the pointing element, in the stereo camera scheme. In such a case, it is likely to be difficult to use a typical lens, and it is conceivable to use a fish-eye lens. In the case where a fisheye lens is used, it is conceivable to use, for example, an equidistance projection scheme using a lens called an fθ lens. Using an fθ lens, however, produces large distortion (compression) particularly at the periphery of a captured image. In a case where the distortion (compression) greatly affects the captured image, an image of the pointing element OB, such as a fingertip, which a target to be detected, is undesirably reduced in size on the sensor. In this case, false detection or unsuccessful detection is quite likely to occur. To avoid the problem, the imager 50 (cameras 50a and 50b) each using a lens characterized by the following expression is used to perform the imaging (stereographic projection scheme) in the present embodiment.

$$y=2f\tan(\theta/2)$$

where f represents the focal length, θ represents the half angle of view (or simply angle of view), and y represents the image height.

In this case, the distortion (compression) in a captured image, particularly, at the periphery thereof can be suppressed as compared with the equidistance projection scheme.

Figure 3:
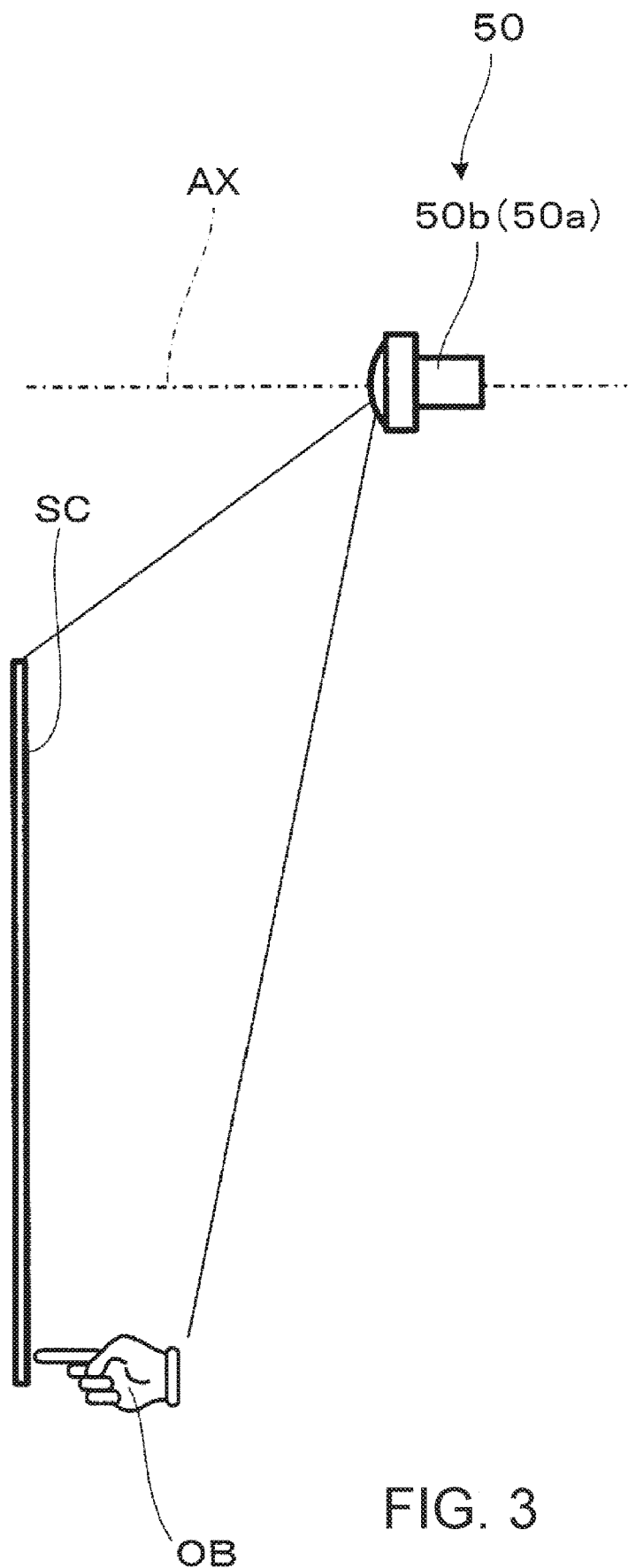
FIG. 3 describes the imaging range of an imager.
Figure 4:
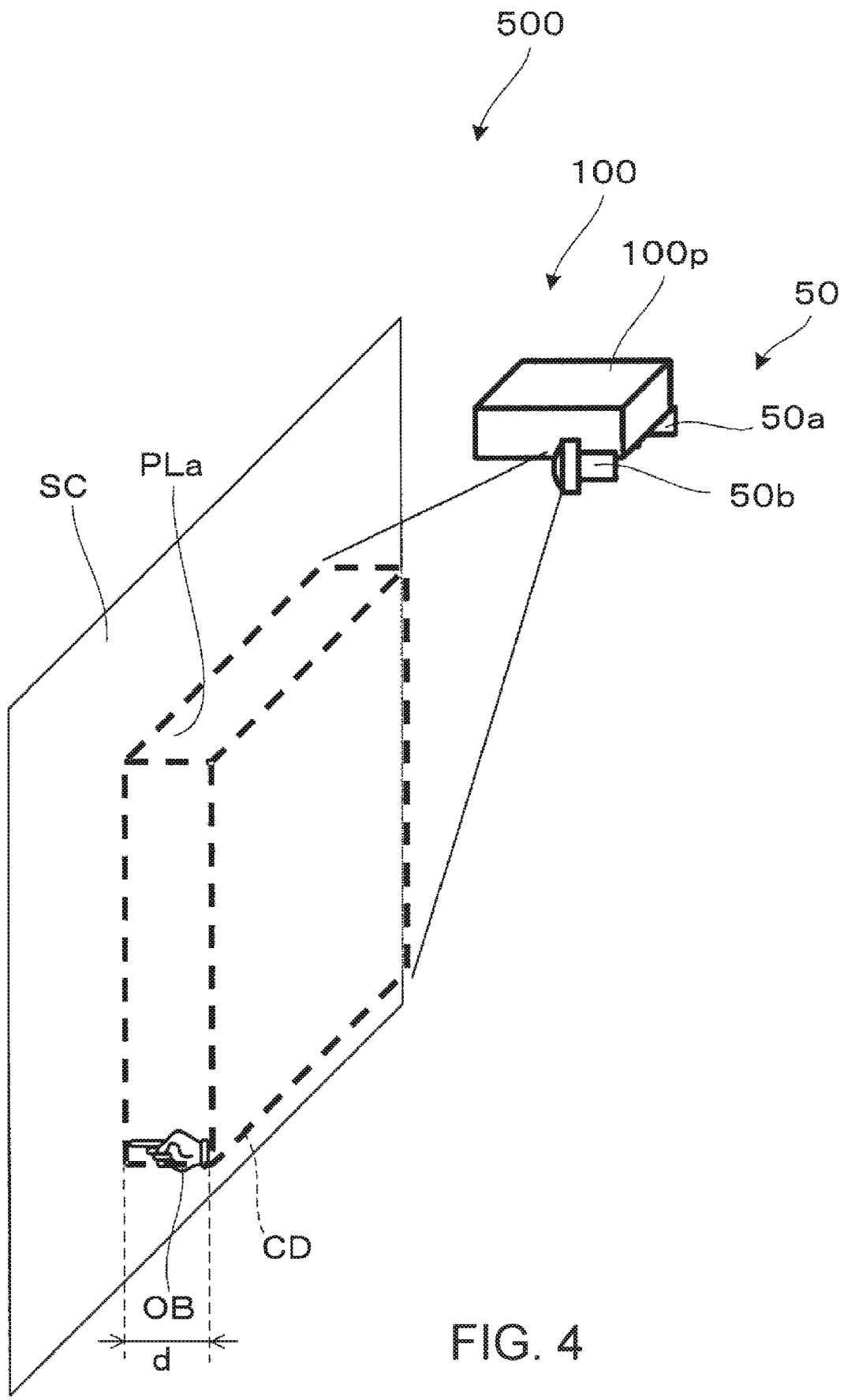
FIG. 4 is a perspective view showing a stereographic region as the imaging range of the imager.

The Imaging range of each of the cameras 50a and 50b, which form the imager 50, will be described below with reference to FIG. 3 and other figures. In FIG. 3, only one camera is shown because the cameras 50a and 50b are symmetrically configured, and the other camera will not be described. As shown in FIG. 3, an optical axis AX of the camera 50b (or camera 50a) is perpendicular to the screen SC, which is the surface onto which the projector main body 100p radiates light, in the present embodiment. That is, the camera 50b is not tilted in the imaging operation. In the present embodiment, the two cameras 50a and 50b can stereographically detect the pointing element (fingertip) OB, which is the target to be detected, based on the parallax. That is, it is necessary to capture an image of the finger with which the user touches the screen SC to obtain information for grasping the user's finger as a stereographic shape having a depth. To this end, the imaging is so performed as to cover not only the radiated region PLa, which is the projection region on the screen SC, but a stereographic region containing the radiated region PLa. In the present embodiment, the range from the screen SC to the plane separate therefrom by a distance d in the direction perpendicular to the screen SC (depth direction) is a stereographic region CD by way of example, as shown in FIG. 4. In the description, the distance d is set at 160 mm (16 cm), which allows the imager 50 to capture an image of a region approximately from the fingertip to the wrist. In this case, the stereographic region CD is a box-shaped region having the radiated region PLa as the bottom surface and the thickness of the distance d, as shown in FIG. 4. The imaging range of the imager 50 (cameras 50a and 50b) is therefore greater than in a case where the imaging range is formed only of the radiated region PLa, and it is therefore in particular necessary to increase the angle of view. The wider the angle of view, the greater the distortion at the periphery of an image, and hence the smaller the image. It is therefore likely to be difficult to detect the finger, which is the pointing element. In contrast, in the present embodiment, the imager 50 (cameras 50a and 50b) employs the stereographic projection scheme, as described above, to avoid the situation described above.

Figure 5A:
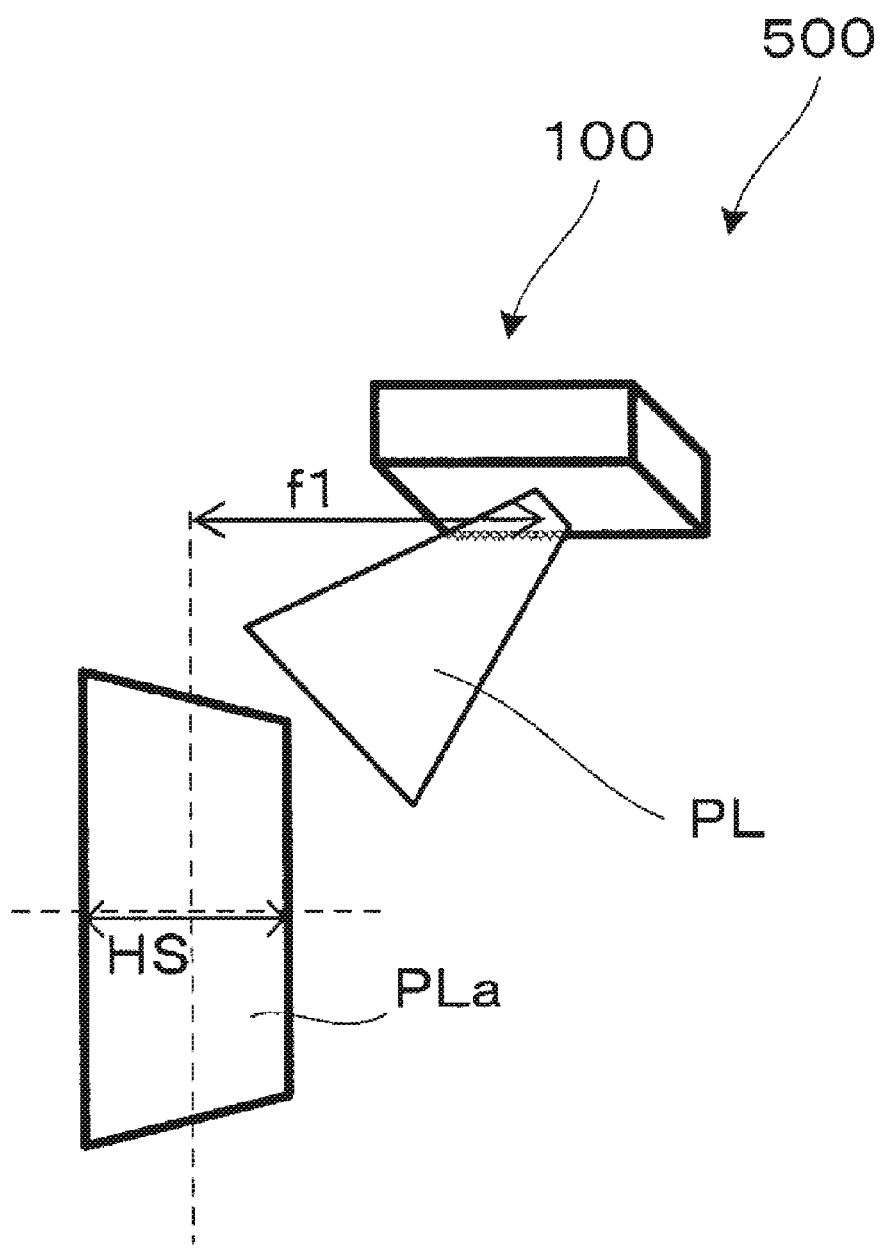
FIG. 5A describes the throw ratio of a project
Figure 5B:
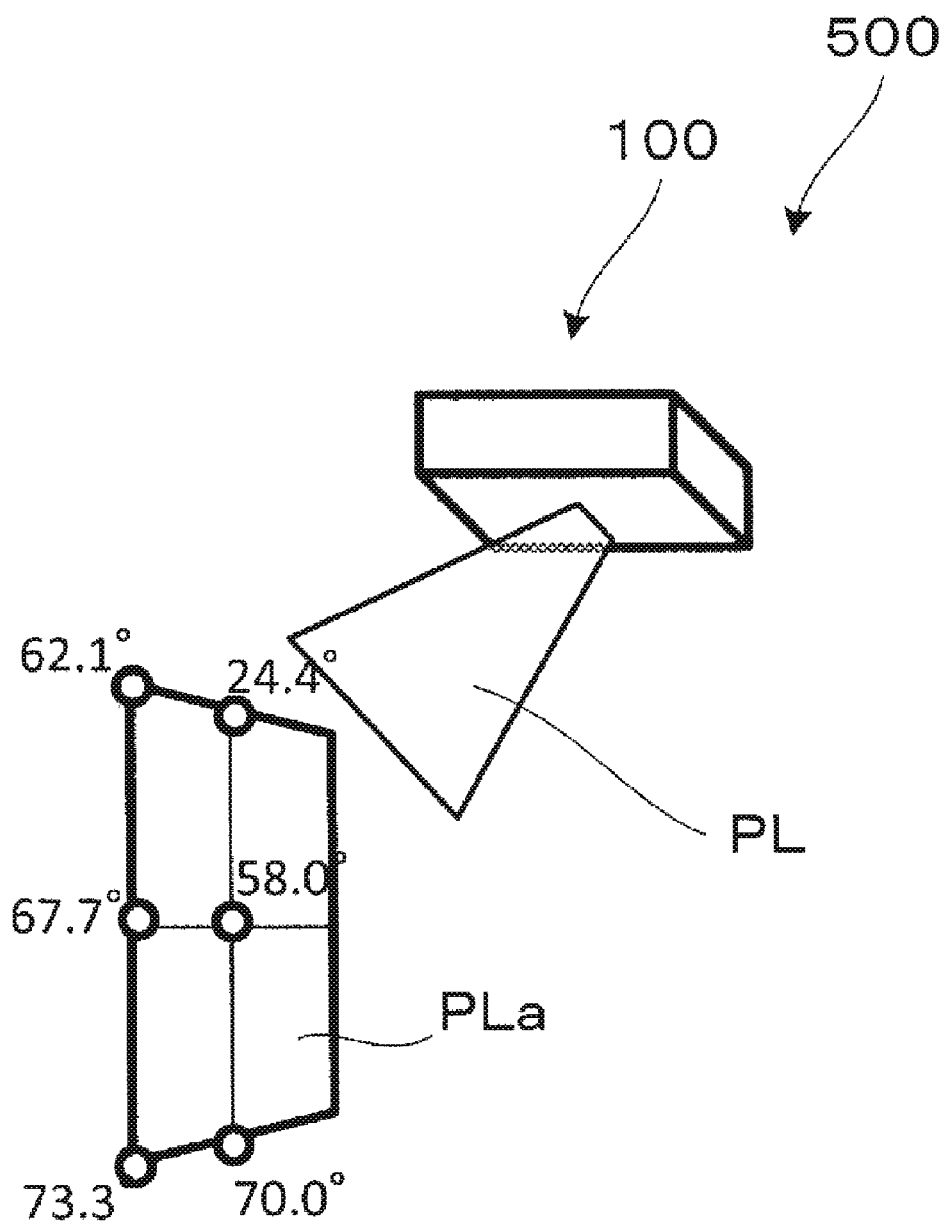
FIG. 5B shows projection angled in some positions on a projection screen onto which the projector performs projection in an example.

A specific configuration example (specific specifications) of the projection performed by the projector will be described below with reference to FIG. 5 and other figures. FIGS. 5A and 5B show the image projection performed by the projector in this example.

The degree of the ultrashort-focal-length proximity projection will first be described with reference to FIG. 5A. The throw ratio of the projector is expressed, for example, by f1/HS, where f1 represents the projection distance, and HS represents the lateral size of the radiated region PLa, as shown in FIG. 5A. In this example, the throw ratio is set at about 0.27. Specifically, it is assumed that the projection distance f1 is 441 mm and the size of the radiated region PLa, which specifies the value of the lateral size HS, is 70 inches (aspect ratio of 16:10) (that is, the projector 100 forms an image having the size of 70 inches). FIG. 5B shows the angles at which the projection light PL is projected onto some points at the periphery of the radiated region PLa in the case described above. In this example, the ultrashort-focal-length proximity projection is performed in accordance with the specific specifications described above.

Figure 6:
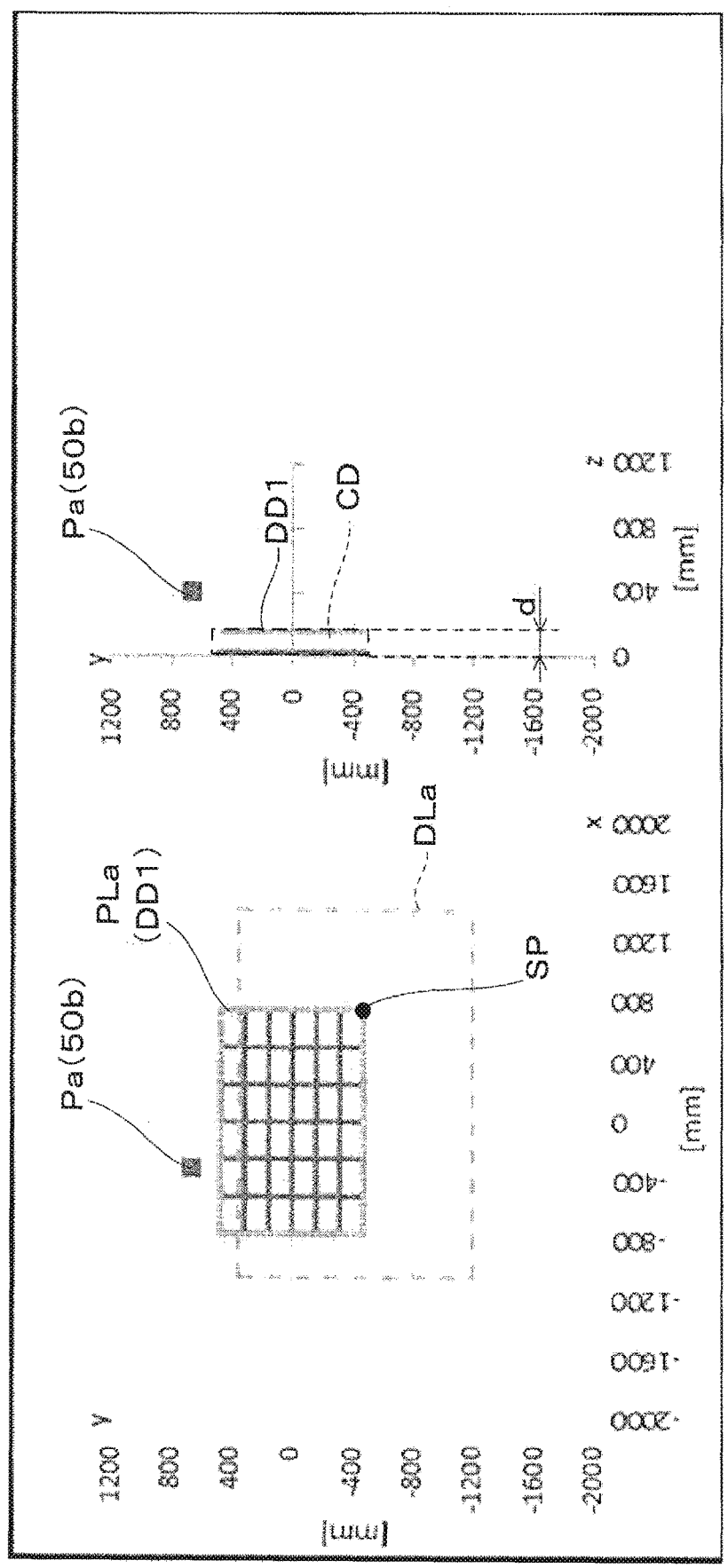
FIG. 6 shows the position of the imager and the dimension of the imaging range in the imaging performed by the projector in the example.

Further, the position of the imager 50 (cameras 50a and 50b) and the dimension of the imaging range in the image projection in the specific example described above will be described with reference to FIG. 6 and other figures. FIG. 6 shows the relationship between the stereographic region CD, which is the imaging range containing the radiated region PLa, and a camera position Pa of one of the cameras that form the imager 50. The other camera will not be illustrated or described because the same discussion applies thereto with the position of the one camera bilaterally reversed. In FIG. 6, the left portion shows the dimensions in the positional relationship viewed from the front side, and the right portion shows the dimensions in the positional relationship viewed from a (lateral) side. In the description, the camera position Pa is leftward above the radiated region PLa and is separate, for example, in the horizontal direction by about 30 cm from the position where the projection light PL is projected, as shown in FIG. 6. In this case, the lower right position SP in the radiated region PLa is farthest from the camera position Pa in the imaging operation. That is, it is necessary to ensure reliable detection of the pointing element in the position SP.

A detection region DD1 is a region of the upper end surface of the stereographic region CD, which is a detection range, and a region DLa drawn with the broken line is the region present on the screen SC and corresponding to the detection region DD1, as shown in FIG. 6. That is, to allow detection in the detection region DD1, the imager 50 needs to be capable of capturing an image of a range from the detection region DD1 to the region DLa converted onto the screen SC. Further, as the value of the distance d increases (as the detection region DD1 is farther away from the radiated region PLa), the region DLa sharply enlarges. The reason for this is that ultrashort-focal-length proximity projection is performed in the present configuration. As described above, the greater the value of the distance d is, the wider the angle of view of the imager 50 needs to be.

Figure 7:
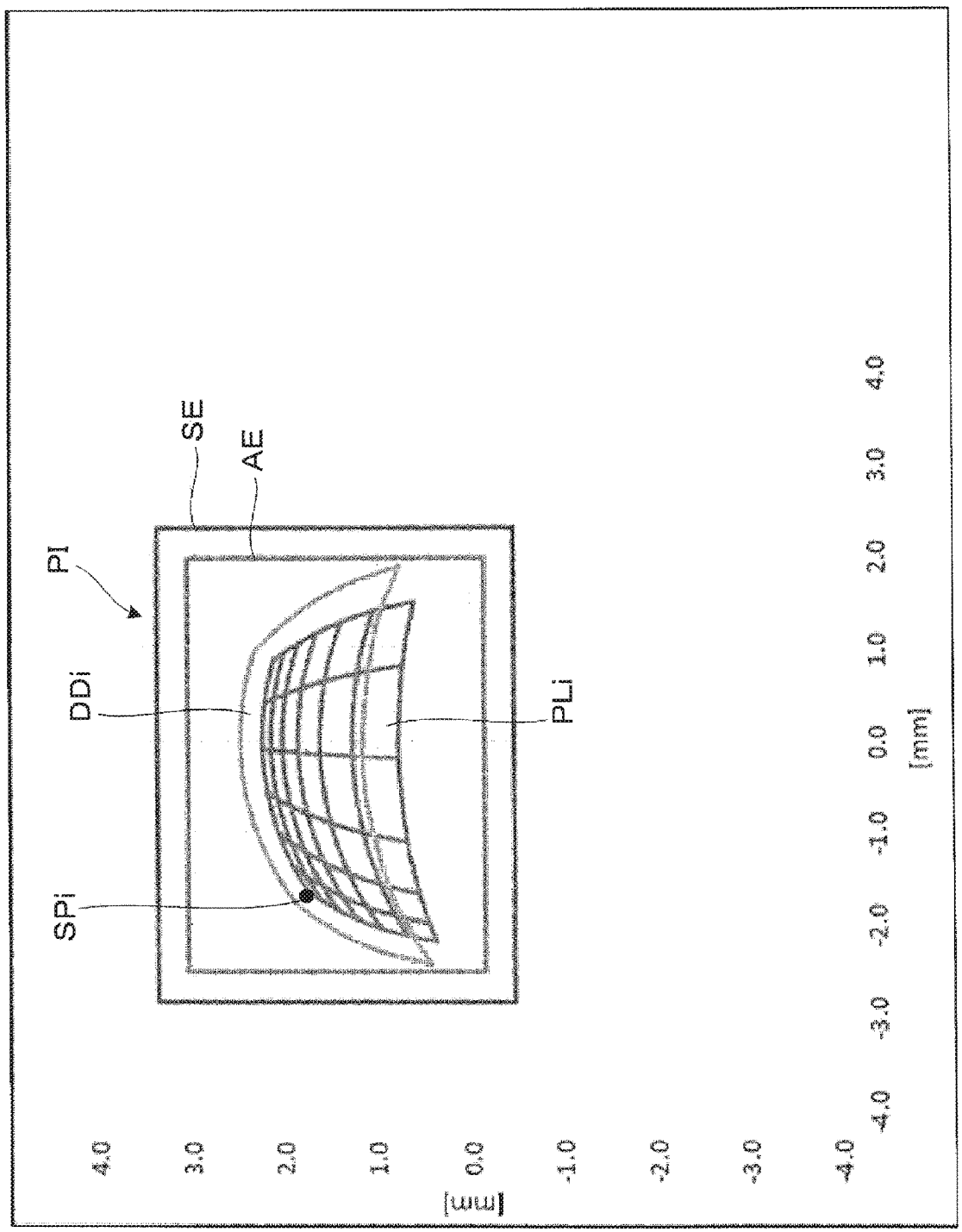
FIG. 7 shows an on-sensor image captured by the imager of the projector in the example.

FIG. 7 shows an image captured with one of the cameras that form the imager 50 that is the camera (camera 50b, for example) located in the position Pa described above, that is, an image on the light receiving sensor built in the camera 50b. In FIG. 7, since the captured video image is reversed in the upward/downward and rightward leftward. directions, a lower right portion of the video image on the screen SC is an upper left portion of the image on the sensor. Therefore, in an image PI shown FIG. 7, an upper-left-corner image point SPi of an image of video PLi corresponding to the radiated region PLa on the screen SC corresponds to the position SP in FIG. 6. In the image PI, an image of video DDi corresponds to the detection region DD1 in FIG. 6. The camera 50a needs to perform the imaging in such a way that the images of video PLi and DDi fall within an active area AE, which is an effective imaging range, of an area SE of the sensor. The captured images of video PLi and DDi each representing a rectangular region are therefore distorted, as shown in FIG. 7. The image of video PLi needs to allow detection of the fingertip, which is the tip of the pointing element which points a position, and the image point SPi and therearound in the region of the image of video PLi are distorted by the greatest degree and therefore believed to be a location where the detection of the pointing element is most difficult. A study has therefore been conducted on the width of a human finger at the location by changing projection conditions for a camera lens that should be employed in the imager 50 (cameras 50a and 50b). As a result, the following conclusion has been reached based on a comprehensive consideration: It is optimum to employ an imager that performs imaging in the stereographic projection scheme as the imager 50 (cameras 50a and 50b).

Figure 8A:
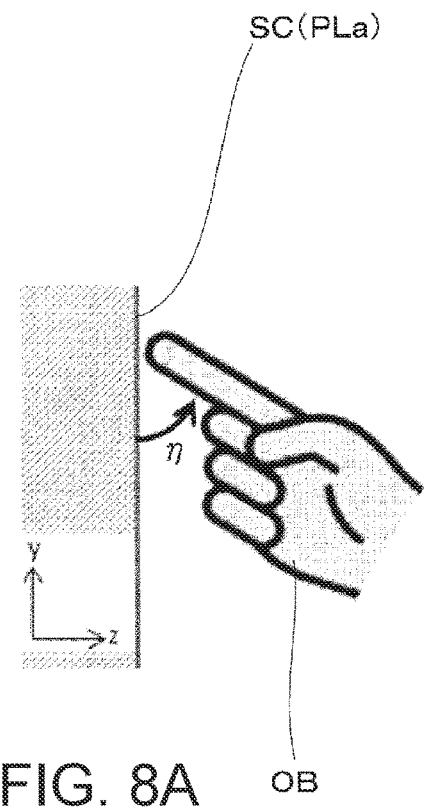
FIG. 8A describes how to specify the attitude (angle) of a pointing element.
Figure 8B:
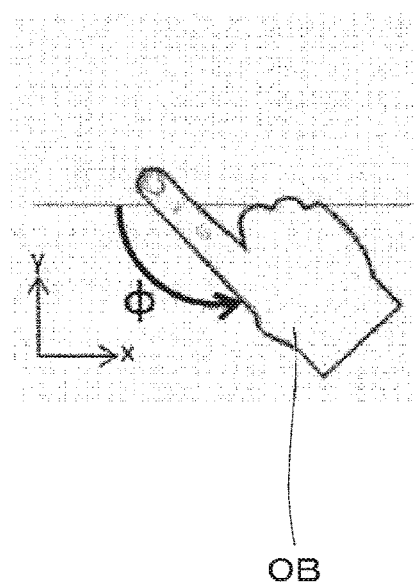
FIG. 8B describes how to specify the attitude (angle) of the pointing element.

In the following sections, a description will be made of examination of an in-image (on-sensor) minimum finger width in a position corresponding to the image point SPi. It is assumed for the examination that the attitude (angle) of the finger, which is the pointing element, is specified. The examination was made in consideration of the size of a standard finger by assuming that a cylinder having a diameter of 10 mm is considered as the finger. FIGS. 8A and 8B show that the angle of the pointing element (finger or 10-mm-diameter cylinder) OB is specified on the screen SC (radiated region PLa). Let η be the angle of the pointing element OB with respect to the screen SC (elevation angle), as shown in FIG. 8A. Further, let φ be a counterclockwise angle (azimuth angle) in the plane of the screen SC with respect to a direction −x (0°), which is a negative-side-oriented direction of a direction x, which is the lateral direction (horizontal direction), as shown in FIG. 8B.

Figure 9:
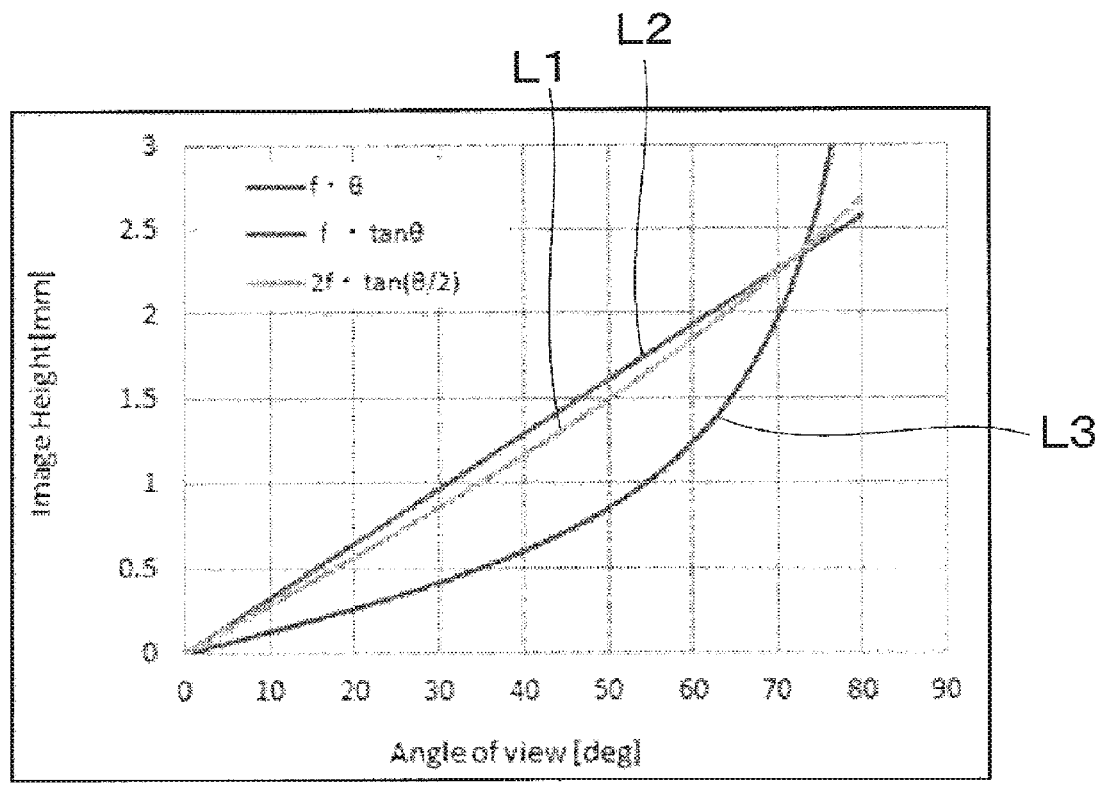
FIG. 9 shows graphs illustrating the relationship between the angle of view and the image height under projection conditions.

How the in-image (on-sensor) width of the pointing element OB (corresponding to finger width) having orientation specified by the angles η and φ described above changes as the angles η and φ change, that is, the attitude of the pointing element OB changes was examined for the following three projection conditions: the equidistance projection, the stereographic projection; and typical projection. The projection conditions are as follows:

$$y = f\theta \quad \text{(equidistance projection);}$$

$$y = 2f\tan(\theta/2) \quad \text{(stereographic projection);}$$

and $$y = f\tan\theta \quad \text{(typical projection)}$$

where f: focal length, θ: half angle of view, and y: image height. The relationships between the angle of view (or half angle of view θ) and the image height y in the projection conditions are shown by curves L1, L2, and L3 shown in FIG. 9. The curve L1 corresponds to the stereographic projection scheme, the curve L2 corresponds to the equidistance projection scheme, and the curve L3 corresponds to the typical projection scheme. As another condition, for example, a sensor effective area corresponding to the active area AE (see FIG. 7) described above has a size of 4.48 mm×3.2 mm. The actual width of the pointing element OB is 10 mm, as described above.

Figure 10:
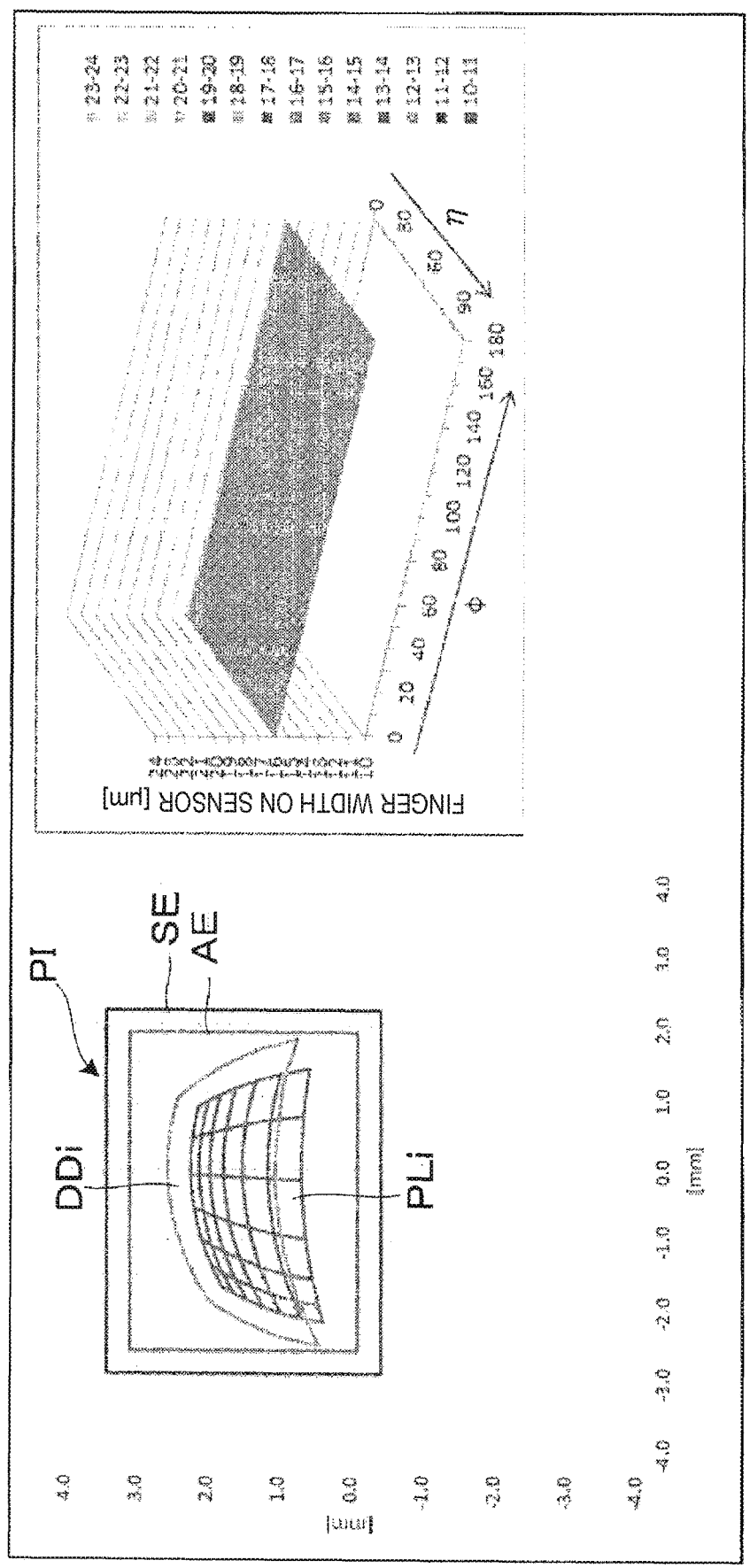
FIG. 10 is a diagram and a graph for describing the relationship between the change in the angle (attitude) of the pointing element and the width of an on-sensor image of the pointing element detected by the imager (stereographic projection scheme).

FIG. 10 shows the relationship between the change in the angle (attitude) of the pointing element OB and the change in the in-image width of the pointing element detected by the imager 50 in the stereographic projection scheme out of the projection conditions described above, that is, in the present embodiment. In FIG. 10, the left portion shows captured images the stereographic projection, and the right portion shows a graph illustrating the in-image size of the width, that is, the on-sensor width (unit: μm) of the pointing element (finger width) pointing at the image point SPi versus changes in the angles η and φ. FIG. 10 shows the calculated finger width that changes as the angle (elevation angle) η changes over a range from 0° to 90° and the angle (azimuth angle) η changes over a range from 0° to 180°. In this case, the result of the calculation of the finger width shows that the finger width remains fixed even when the angles η and φ change, as shown in FIG. 10. The in-image (on-sensor) minimum width of the pointing element in this case was 15.9 μm.

Figure 11A:
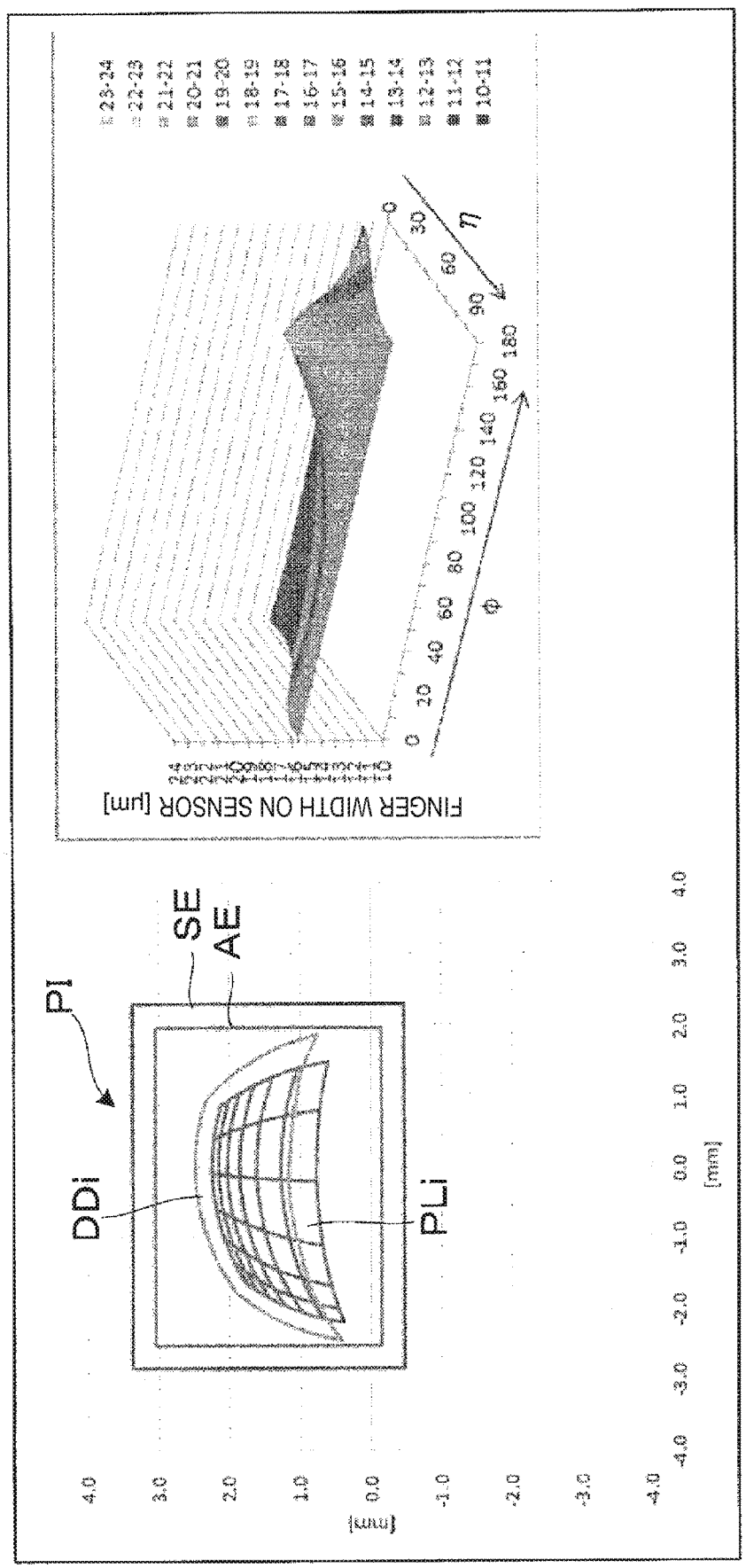
FIG. 11A is a diagram and a graph for describing the relationship between the change in the angle (attitude) of the pointing element and the width of an on-sensor image of the pointing element detected by an imager in Comparative Example (equidistance projection scheme).

On the other hand, as Comparative Example, FIG. 11A shows the relationship between the change in the angle (attitude) of the pointing element and the change in the in-image width of the pointing element detected by an imager in the equidistance projection scheme out of the projection conditions described above. In this case, FIG. 11A shows that the finger width changes as the angles η and φ change. The minimum width of the pointing element in this case was 11.5 μm. That is, Comparative Example shows that the minimum width of the pointing element is significantly smaller than that in the present embodiment described above.

Figure 11B:
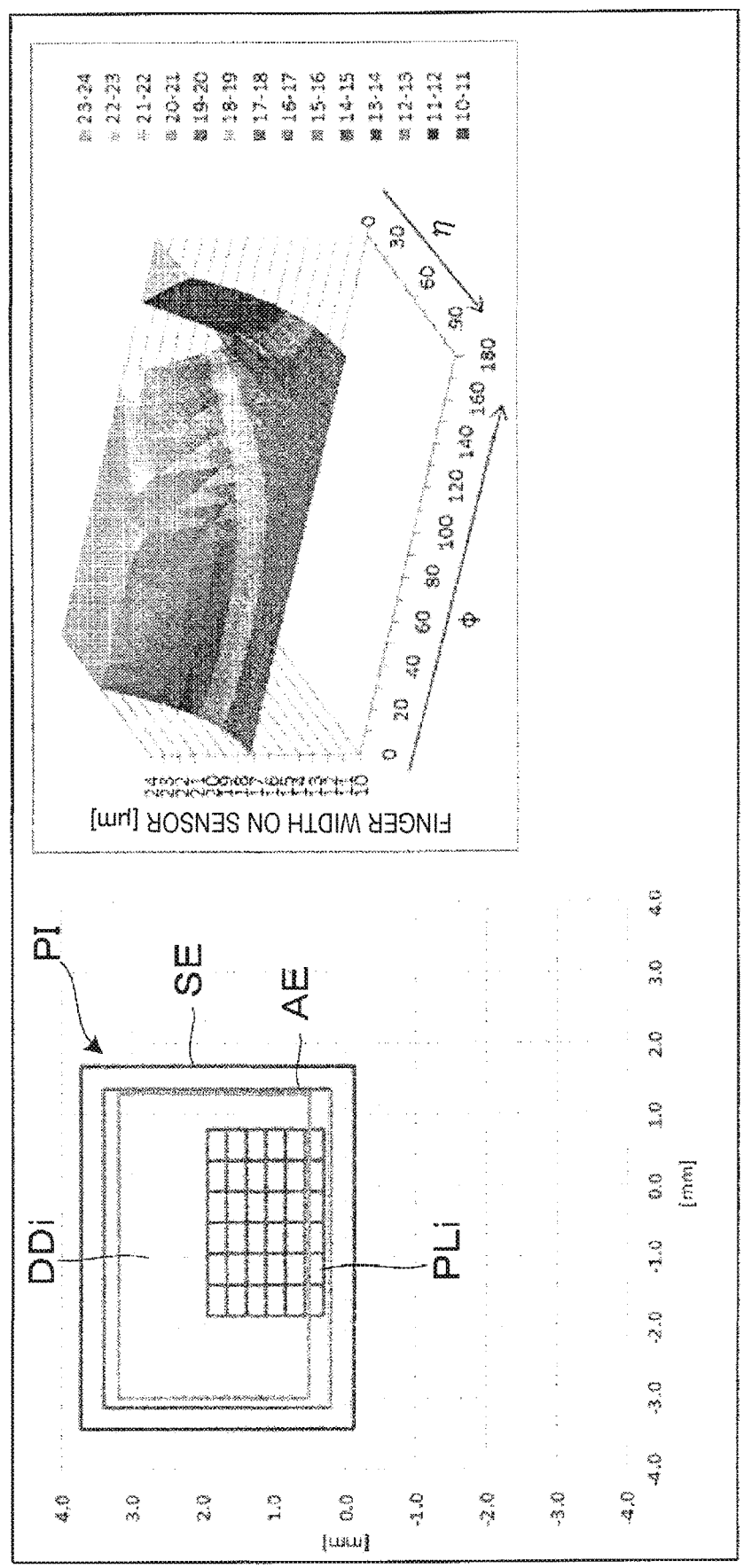
FIG. 11B is a diagram and a graph for describing the relationship between the change in the angle (attitude) of the pointing element and the width of an on-sensor image of the pointing element detected by an imager in another Comparative Example.

As another Comparative Example, FIG. 11B shows the relationship between the change in the angle (attitude) of the pointing element and the change in the in-image width of the pointing element detected by an imager in the typical projection scheme out of the projection conditions described above, that is, an imager that uses no fish-eye lens or any other similar lens. This case differs from the two cases described above in that a captured image is not distorted (or substantially not distorted), as shown in the left portion of FIG. 11B. Also in this case, FIG. 11B shows that the finger width changes as the angles η and φ change. Further, the finger width is large (thick finger) on the whole, and the minimum width of the pointing element in this case was 17.3 μm (when η=90°).

In the above description, comparison in terms only of the in-image (on-sensor) minimum width of the pointing element shows that the largest size is maintained in Comparative Example shown in FIG. 11B. However, the projector system 500 according to the present embodiment is configured on the assumption that the ultrashort-focal-length proximity projection is performed, as described above. The imager 50 therefore needs to have a wide angle of view. It is therefore very difficult to optically design an imager 50 based on the typical projection scheme. It has therefore been determined that the imaging is performed based on the stereographic projection scheme in the present embodiment.

The results of study on a variety of projection conditions including the projection conditions described above will be described below with reference to FIG. 12. In the description, the projection conditions are expressed by the following expression, and the minimum finger width was calculated by changing the coefficient (1/C) the expression from 0 to 1, $y = Cf \tan(\theta/C)$ In the above expression, when $C=\infty$ (1/C=0), $y=f\theta$     (equidistance projection), when $C=2$ (1/C=0.5), $y=2f\tan(\theta/2)$   (stereographic projection), and when $C=1$ (1/C=1), $y=f\tan\theta$     (typical projection)

Figure 12:
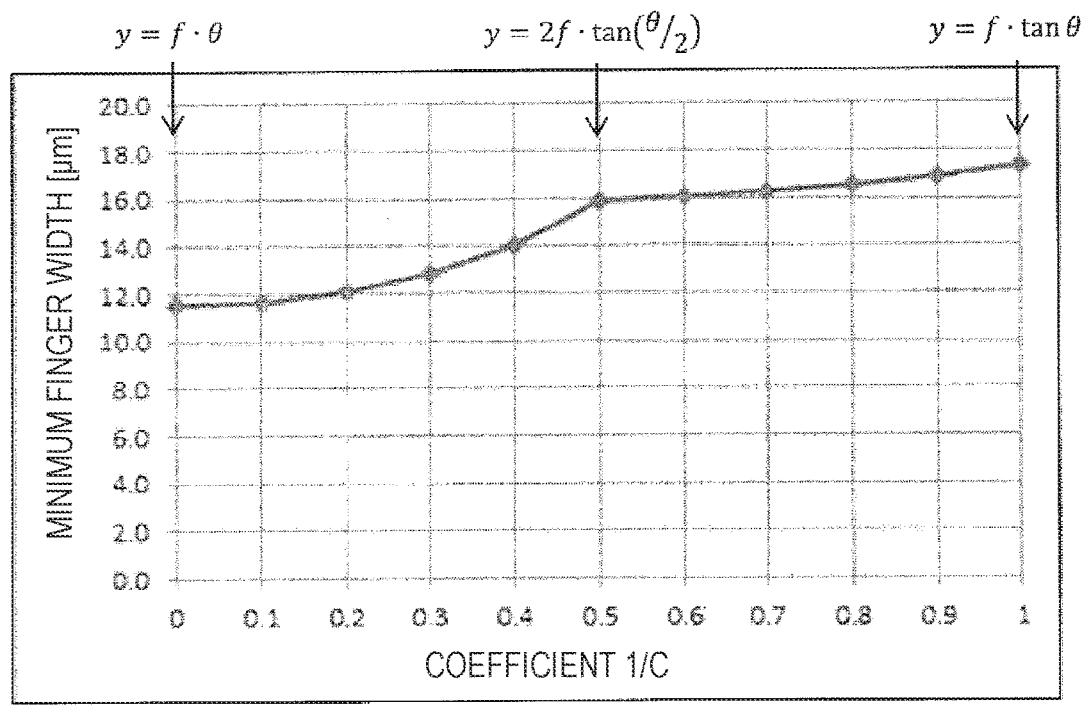
FIG. 12 shows a graph illustrating the relationship between projection conditions and the on-sensor width of the pointing element.
Figure 13:
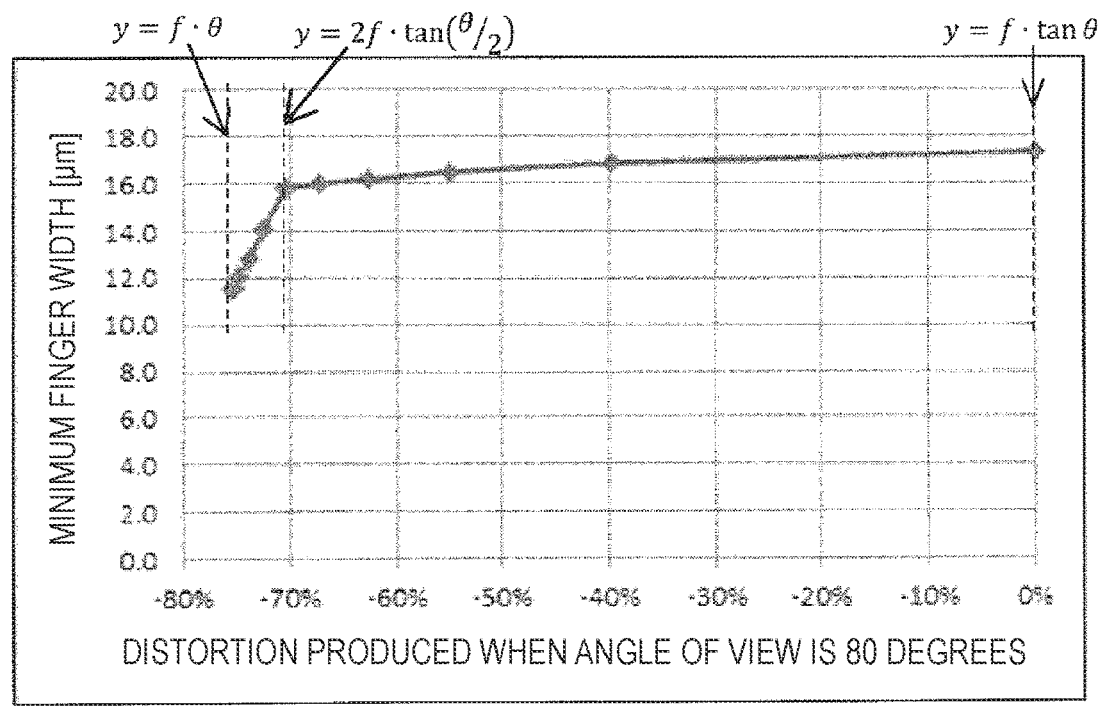
FIG. 13 shows a graph illustrating the relationship between distortion and the on-sensor width of the pointing element.

FIG. 12 shows a graph illustrating a summary of the results described above. That is, the horizontal axis of FIG. 12 represents the value of the coefficient (1/C), and the vertical axis of FIG. 12 represents the value of the in-image (on sensor) minimum width of the pointing element. The graph in FIG. 12 also shows that the stereographic projection scheme allows the value of the minimum width of the pointing element OB to be maintained larger than in the equidistance projection scheme or a scheme similar thereto. The graph in FIG. 12 further shows that the value of the minimum width does not greatly change in the stereographic projection scheme as compared with the typical projection scheme, which has difficulty in optical design. It is, however, noted that the horizontal axis of FIG. 12 does not necessarily show the difficulty in the optical design. The projection schemes are further compared with one another in terms of distortion (ratio of actual image height in each projection scheme to ideal image height), which is believed to be interrelated by a greater degree with the difficulty in the optical design. FIG. 13 shows a graph illustrating the relationship between the distortion and the in-image n-sensor) minimum width of the pointing element in a case where the angle of view is set at 80°. In FIG. 13, the three projection schemes described above are shown in the positions corresponding thereto. The graph shows that the equidistance projection scheme and the stereographic projection scheme are relatively close to each other. That is, the two schemes are believed not to greatly differ from each other in terms of difficulty in the optical design. On the other hand, it is shown that the graph has a large gradient between the two schemes. That is, comparison between the two schemes shows that the stereographic projection scheme allows an increase in the in-image (on-sensor) finger width without a large increase in the difficulty in the lens design.

Figure 14:
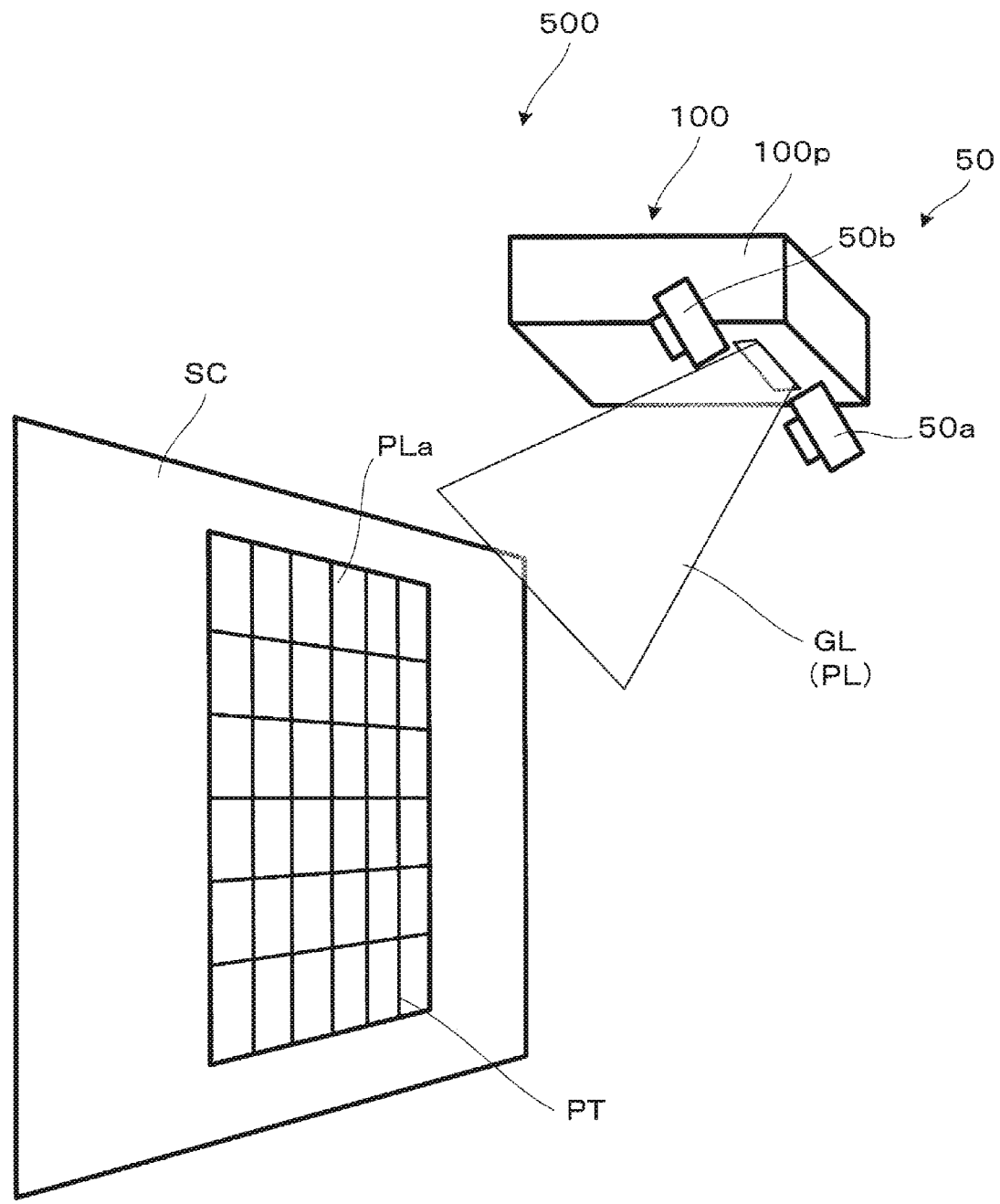
FIG. 14 shows that a pattern image for calibration is projected.

The calibration, which is a positioning process that is a prerequisite for allowing interactive image projection, will be described below with reference to FIG. 14. FIG. 14 shows the image projection performed by the projector main body 100p, particularly, projection of a calibration pattern image for the calibration described above. In the present embodiment, it is assumed that the projector main body 100p first performs image projection of projecting a pattern image PT showing the range of a video image displayed on the screen Sc by using pattern image light GL, which is formed of light that belongs to a green wavelength band out of the light components that are contained in the projection light PL, which is the image light, and belong to the visible wavelength band. The imager 50 receives part of the components of the pattern image light GL to acquire image information on the pattern image PT and identifies the image projection position based on the information. Specifically, the imager 50 first transmits the image information on the captured pattern image PT to the projector main body loop. The projector main body 100p then associates the information on the pattern image PT acquired by the imager 50 with information on the pixel matrix in the light modulation. That is, each position on the sensor for receiving the pattern image PT captured by the imager 50 is associated with each position on the image matrix in the light modulation performed by the projector main body 100p, that is, each position on the projected image. The association process may be carried out, for example, on a pixel basis (corresponding table may be created, for example), or a function that associates the two types of position with each other may be specified to allow the association process.

As described above, the projector main body 100p performs the calibration (positioning) by associating the image projection position based on the information on the pattern image PT acquired by the imager 50 with the position of a pixel in the modulation. After the calibration, the position at which the pointing element OB detected by the imager 50 is pointing can be identified based on the association process carried out in the calibration, and interactive image projection that reflects the identified pointing position is achieved.

As described above, in the projector system 500 according to the present embodiment, the imager 50, which operates based on the stereographic projection scheme, can have an increased angle of view, can therefore capture not only an image of the projection region (radiated region PLa) where the obliquely projected image light (projection light) is projected but an image of the stereographic region CD containing the projection region, and can further reliably grasp the pointing element OB present in the stereographic region CD. In particular, employing the stereographic projection scheme as the scheme based on which the imager 50 operates can avoid a situation in which changes in the angles η and φ of the pointing element OB distort the pointing element OB and reduce the size thereof in an image while suppressing the difficulty in the optical design of the imager 50, whereby the position of the pointing element OB can be reliably detected.

Second Embodiment

A second embodiment, which is a variation of the first embodiment, will be described below with reference to FIG. 15. A projector sys tem according to the present embodiment has the same configuration as that in the first embodiment except that the attitude (tilt angle) of the imager 50 is changed, and illustration and description of the entire projector system will be omitted. Further, it is assumed that a specific configuration example (specific specifications) is the same as that shown in the first embodiment. The present embodiment, however, in which the tilt angle is changed, differs from the first embodiment in that the focal length f changes with an increase or decrease in the tilt angle (focal length f is unchanged in first embodiment because tilt angle is 0°).

Figure 15:
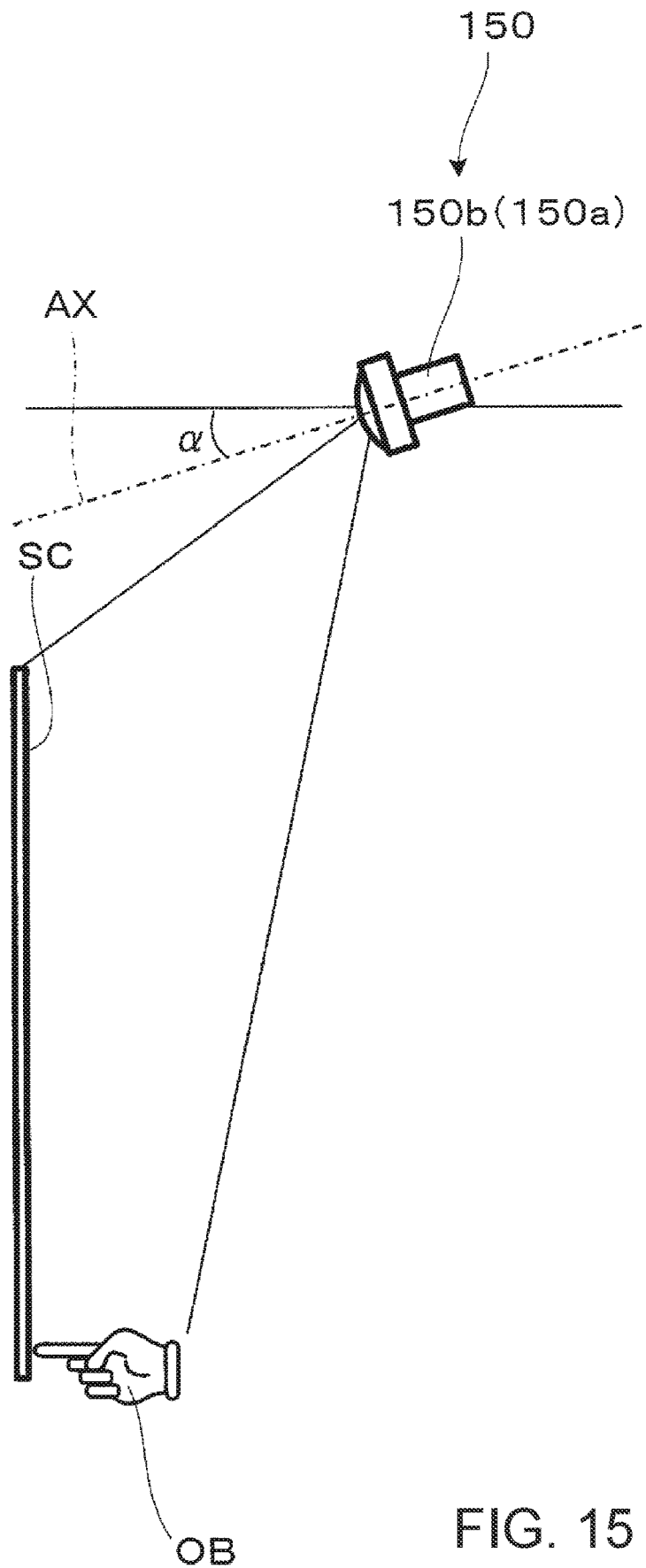
FIG. 15 describes the imaging range of an imager in a projector system according to a second embodiment.

FIG. 15 describes the attitude and the imaging range of an imager 150 in the projector system according to the present embodiment and corresponds to FIG. 3. It is assumed that the imager 150 is formed of cameras 150a and 150b, as in the first embodiment, Comparison with FIG. 3 clearly shows that in the imager 150 in the present embodiment shown in FIG. 15 by way of example, the optical axis AX of the camera 150b (or camera 150a) is not perpendicular to the screen SC but slightly inclines downward. That is, the camera 150b (or camera 150a) is tilted in the imaging operation. In this case, adequately increasing the tilt angle allows a decrease in the maximum angle of view necessary for the aging performed by the imager 150 as compared with the case where the imager 50 is not tilted (tilt angle is 0°), as in the first embodiment. In the description, the tilt angle α is set at 10° by way of example.

Figure 16:
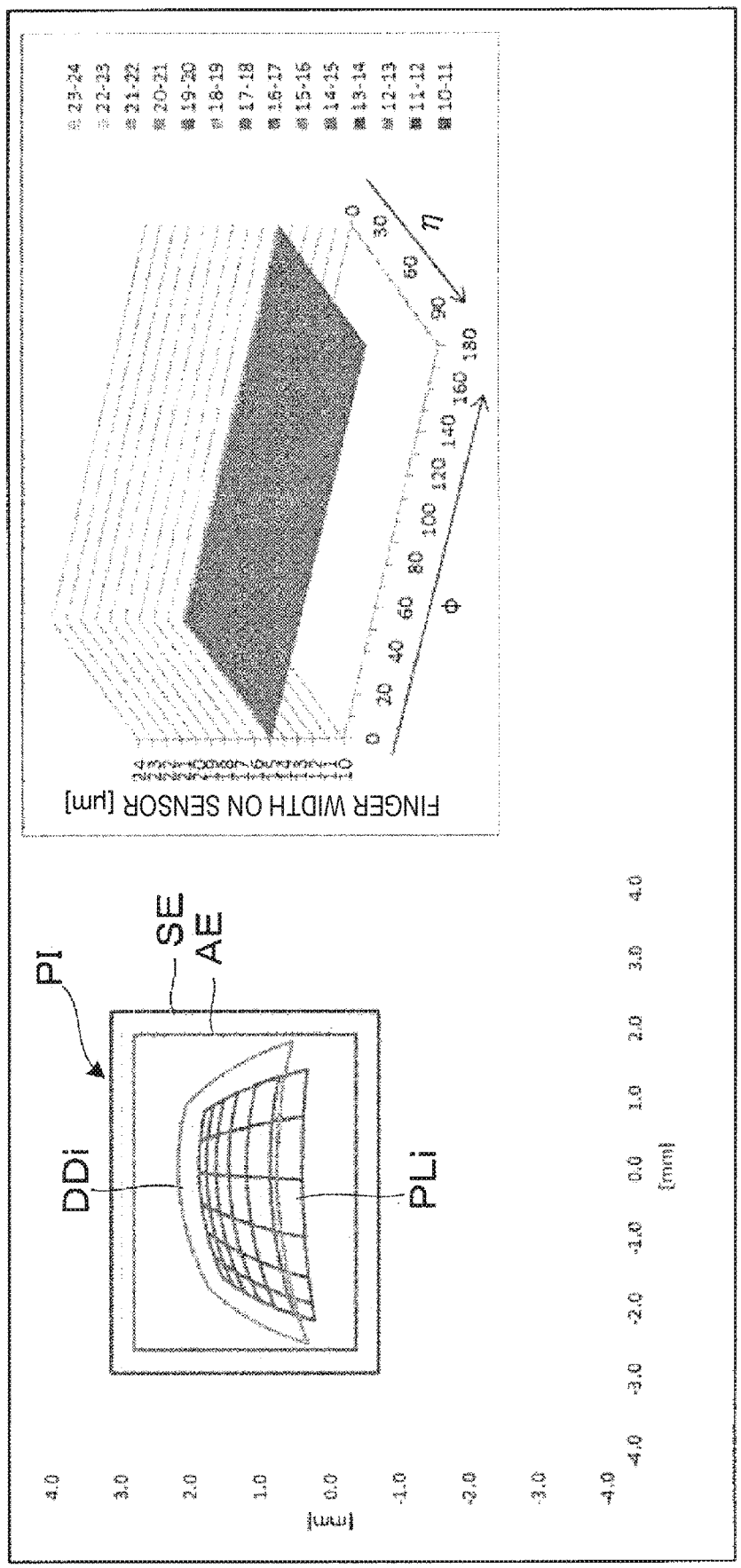
FIG. 16 is a diagram and a graph for describing the relationship between the change in the angle (attitude) of the pointing element and the width of an on-sensor image of the pointing element detected by the imager (stereographic projection scheme).

FIG. 16 is a diagram and a graph for describing the relationship between the change in the angle (attitude) of the pointing element and the change in the in-image width of the pointing element detected by the imager 150 (stereographic projection scheme) in the present embodiment in the same specific configuration example (specific specifications) as that in the first embodiment. That is, FIG. 16 corresponds to FIG. 10. Also in this case, the result of the calculation of the finger width shows that the finger width remains fixed even when the angles η and φ, which have been specified with reference to FIGS. 8A and 8B, change. The minimum width of the pointing element in this case was 14.9 μm. In this case, the minimum width slightly decreases, as compared with the minimum width in FIG. 10.

Figure 17:
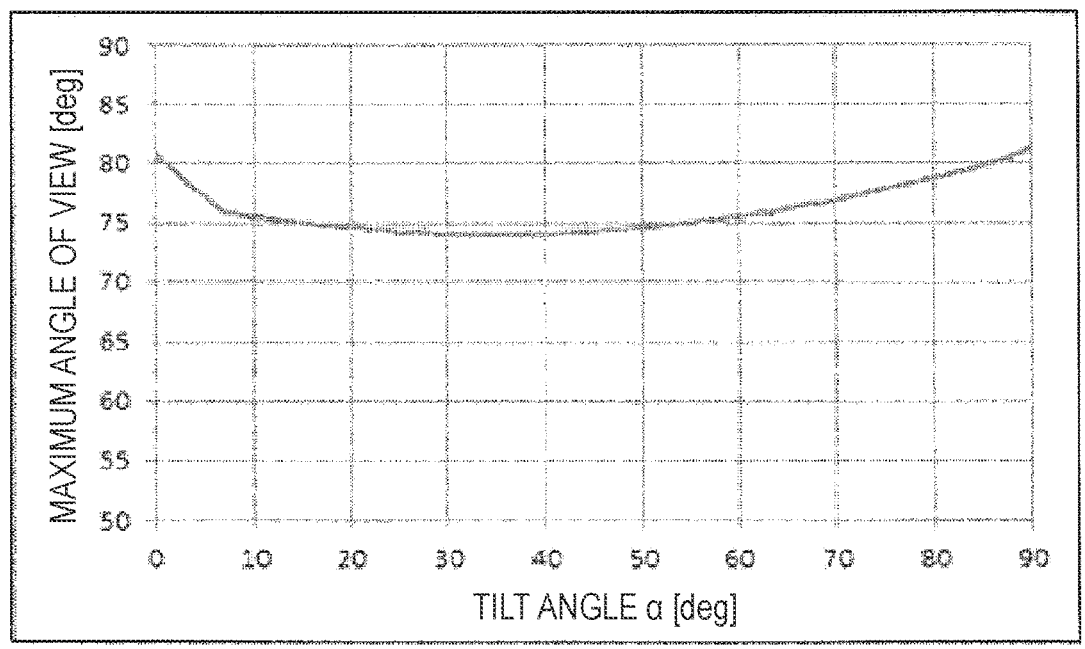
FIG. 17 shows a graph illustrating the relationship between the tilt angle of the imager and the maximum angle of view.
Figure 18:
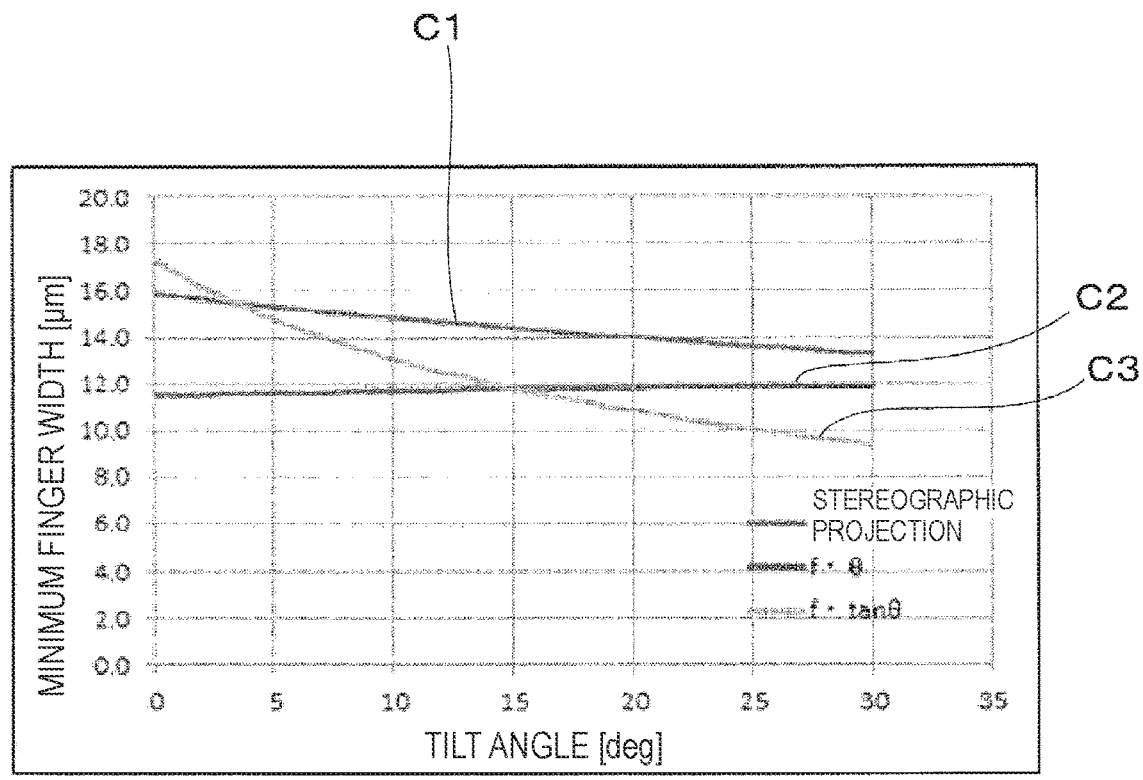
FIG. 18 shows graphs illustrating the relationship between the tilt angle and the in-image width of the pointing element in the projection conditions.

Since the maximum angle of view of the imager 150 can be reduced because the imager 150 is tilted by the tilt angle α having a certain magnitude as described above, the difficulty in camera lens design can be lowered. On the other hand, however, increasing the tilt angle reduces the minimum width of the pointing element (finger width). That is, there is a tradeoff between the difficulty in the camera lens design and an increase in the finger width. It is therefore necessary to set balance therebetween. To this end, the tilt angle α is set at 10°, as described above. The value (tilt angle α=10°) is one value that falls within a range considered to be optimum in the specific configuration example (specific specifications) in the present embodiment. FIG. 17 shows a graph illustrating the relationship between the tilt angle α of the imager 150 and the maximum angle of view necessary for the imaging in the case described above. The graph shows that the maxi angle of view decreases from the point where the tilt angle α is 0°, has a large gradient (degree of decrease) to the point where the tilt angle α is about 10°, and is substantially fixed within a certain range in the vicinity of 10°. This shows that the design difficulty is readily relaxed as long as the tilt angle α is, for example, about 10°±5°. FIG. 18 shows graphs illustrating the relationship between the tilt angle and the min imp m width of the pointing element (finger width) in the three projection conditions described above. The curve C1 corresponds to the stereographic projection scheme employed in the present embodiment, the curve C2 corresponds to the equidistance projection scheme, and the curve C3 corresponds to the typical projection scheme. The graphs show that increasing the tilt angle α reduces the minimum width of the pointing element (finger width) in the stereographic projection scheme and further show that the minimum width (finger width) is maximized in the region beyond the point where the tilt angle α is 5° in the stereographic projection scheme among the three schemes.

The reason why the tilt angle α is set at 10° as described above results from the specific configuration example (specific specifications) of the present embodiment, and an optimum tilt angle differs from 10° to some extent in some cases depending on the configuration example. It is, however, believed that the same tendency applies. For example, the tilt angle α can be set, for example, at 10°±5° as a value in the vicinity of 10° to maintain the reliable detection of the pointing element with the maximum angle of view of the imager suppressed.

As described above, also in the projector system according to the present embodiment, employing the stereographic projection scheme as the scheme based on which the imager 150 operates can avoid the situation in which the pointing element, which is a subject, is distorted and reduced in size in an image while suppressing the difficulty in the optical design of the imager 150, whereby the position of the pointing element can be reliably detected.

Further, increasing the tilt angle tends to reduce the minimum width of the pointing element (finger width), as described above. Therefore, for example, in a case where the throw ratio of the projector is smaller and it is therefore necessary to increase the angle of view of the imager, allowing the imager to tilt is effective in suppressing an increase in the angle of view of the imager, as shown in the present embodiment (second embodiment). On the other hand, in a case where the throw ratio of the projector is relatively large, a very large tilt angle not required, and it is therefore believed to be preferable that the imager is not tilted, for example, as in the first embodiment or the tilt angle is set at a small value to increase the width of the finger instead of proactively tilting the imager.

Modifications

The invention is not limited to the embodiments described above and can be implemented in a variety of aspects to the extent that they do not depart from the substance of the invention.

The above description has been made with reference to the specific configuration example (specific specifications) only by way of example, and a variety of other configuration examples are conceivable. For example, the radiated region (projection region) having the size of 70 inches is formed in the above description, and it is conceivable that the size of the radiated region (projection region) is 70 inches or greater (ranges from about 70 to 120 inches, for example). Further, for example, the distance d in the depth direction of the stereographic region CD is set at 160 mm (16 cm), and it is conceivable that the distance d is 16 cm or greater. Further, the throw ratio in the proximity projection is set at about 0.27 and may instead, for example, be 0.27 or smaller. In addition to the above, for example, it is conceivable that the projection distance f1 of the projector 100 is set at a different value.

Further, in the above description, the parallax information based on the image information acquired by the pair of cameras 50a and 50b, which form the imager 50, allows the pointing element to be grasped as a stereographic shape. In this process, the image information from each of the cameras 50a and 50b undergoes image processing performed based on the association process carried out in the calibration. The image processing may be separately performed based on the image information from each of the cameras 50a and 50b. Instead, a processing method for one of the cameras may be bilaterally reversed and used for the other camera by making use of the fact that the pair cameras 50a and 50b are bilaterally symmetric. Further, in this case, the image processing performed on the information on the two images may be collectively performed.

In the above description, the projector controller CT or a PC or any other apparatus connectable to the projector 100 performs a variety of processes. A process for which the projector controller CT or the PC is responsible can be carried out in a variety of aspects. For example, it is conceivable that the PC, for example, identify the image projection position based on information on the projection light PL acquired by the imager 50 and the position based On detected light DL detected by the imager 50. In other words, the projector controller CT may identify the image projection position described above and the position at which the pointing element is pointing, and an externally connected instrument, such as a PC, may perform part or entirety of the image projection control based on the identified positional relationship (PC or any other apparatus form projector controller). Conversely, no PC or any other apparatus may be connected to the projector 100, and the projector controller CT can, for example, be responsible for all processes (PC-less configuration).

Further, in the above description, the pattern image PT is projected in the calibration by using the pattern image light GL, which is formed of light that belongs to the green wavelength band. The pattern image PT is not necessarily projected by using light that belongs to the green wavelength band, and it is conceivable to use light that belongs to another wavelength band.

In the above description, the light source, the light modulator, the projection optical system, and other components that fora the projector main body 100p have not been illustrated or described in detail. The components described above may be configured in a variety of aspects. For example, the light source is not necessarily configured as described above and may, for example, be an ultrahigh-pressure mercury lamp, and the light therefrom may be separated into three light fluxes before used. The light modulator is not necessarily configured as described above, and it is, for example, conceivable that the light modulator is formed of a liquid crystal panel combined with a color filter, a reflective liquid crystal panel, or a digital micromirror device.

The entire disclosure Japanese Patent Application No. 2016-225729, filed on Nov. 21, 2016 is expressly incorporated by reference herein.

What is claimed is:

1. A projector system comprising:
   a projector main body that obliquely projects image light; and
   an imager that operates based on a stereographic projection scheme and captures an image of a stereographic region containing a projection region where the image light from the projector main body is projected to detect a pointing element present in the stereographic region,
   wherein the projector main body has a throw ratio smaller than or equal to 0.27.

2. The projector system according to claim 1, wherein the imager includes at least two cameras that each of cameras captures an image of the stereographic region.

3. The projector system according to claim 1, wherein the projector main body forms a projection region greater than or equal to 70 inches.

4. The projector system according to claim 1, wherein the imager inclines by a tilt angle that falls within a range of 10°±5°.

5. The projector system according to claim 1, wherein the imager performs the imaging in such a way that the stereographic region includes a region from the projection region to a plane in front thereof and separate therefrom by at least 16 CM.

6. The projector system according to claim 1, further comprising a projector controller that identifies an image projection position based on information on the image light acquired by the imager and a position of the pointing element detected by the imager and performs image projection control based on a relationship between the identified image projection position and the identified position of the pointing element.

7. The projector system according to claim 2, further comprising a projector controller that identifies an image projection position based on information on the image light acquired by the imager and a position of the pointing element detected by the imager and performs image projection control based on a relationship between the identified image projection position and the identified position of the pointing element.

8. The projector system according to claim 3, further comprising a projector controller that identifies an image projection position based on information on the image light acquired by the imager and a position of the pointing element detected by the imager and performs image projection control based on a relationship between the identified image projection position and the identified position of the pointing element.

9. The projector system according to claim 4, further comprising a projector controller that identifies an image projection position based on information on the image light acquired by the imager and a position of the pointing element detected by the imager and performs image projection control based on a relationship between the identified image projection position and the identified position of the pointing element.

10. The projector system according to claim 5, further comprising a projector controller that identifies an image projection position based on information on the image light acquired by the imager and a position of the pointing element detected by the imager and performs image projection control based on a relationship between the identified image projection position and the identified position of the pointing element.

11. The projector system according to claim 1, wherein the projector main body performs image projection that reflects information on a position of the pointing element detected by the imager.

12. The projector system according to claim 2, wherein the projector main body performs image projection that reflects information on a position of the pointing element detected by the imager.

13. The projector system according to claim 3, wherein the projector main body performs image projection that reflects information on a position of the pointing element detected by the imager.

14. The projector system according to claim 4, wherein the projector main body performs image projection that reflects information on a position of the pointing element detected by the imager.

15. The projector system according to claim 5, wherein the projector main body performs image projection that reflects information on a position of the pointing element detected by the imager.

16. The projector system according to claim 6, wherein the projector main body performs image projection that reflects information on a position of the pointing element detected by the imager.

17. A projector system comprising:
a projector main body that obliquely projects image light; and
an imager that operates based on a stereographic projection scheme and captures an image of a stereographic region containing a projection region where the image light from the projector main body is projected to detect a pointing element present in the stereographic region,
wherein the imager inclines by a tilt angle that falls within a range of $10°±5°$.

18. A projector system comprising:
a projector main body that obliquely projects image light; and
an imager that operates based on a stereographic projection scheme and captures an image of a stereographic region containing a projection region where the image light from the projector main body is projected to detect a pointing element present in the stereographic region,
wherein the imager performs the imaging in such a way that the stereographic region includes a region from the projection region to a plane in front thereof and separate therefrom by at least 16 cm.

* * * * *